United States Patent [19]

Campbell

[11] 3,916,312

[45] Oct. 28, 1975

[54] PORTABLE AUDIO COMMUNICATION TRANSCEIVER DEVICE

[76] Inventor: William Lewis Campbell, 150 Bonita, Arcadia, Calif. 91006

[22] Filed: Sept. 11, 1973

[21] Appl. No.: 396,154

[52] U.S. Cl. ........... 325/16; 179/156 A; 179/182 R; 325/117; 325/118; 325/361

[51] Int. Cl.² ........................................ H04M 1/05

[58] Field of Search ............. 325/16, 111, 117–119, 325/361; 179/107 R, 107 E, 107 H, 156 A, 156 R, 182

[56] References Cited

UNITED STATES PATENTS

| | | | |
|---|---|---|---|
| 2,904,640 | 9/1959 | Dreher | 179/156 A |
| 3,114,105 | 12/1963 | Neumiller | 325/118 |
| 3,280,273 | 10/1966 | Flygstad et al. | 179/156 A |
| 3,588,384 | 6/1971 | Negley | 179/156 A |
| 3,692,958 | 9/1972 | Dymoke | 179/156 A |

FOREIGN PATENTS OR APPLICATIONS

| | | | |
|---|---|---|---|
| 1,144,294 | 3/1969 | United Kingdom | 179/156 A |

*Primary Examiner*—Robert L. Griffin
*Assistant Examiner*—Marc E. Bookbinder
*Attorney, Agent, or Firm*—Henry M. Bissell

[57] ABSTRACT

An improved portable voice communication device is provided which comprises a speaker-microphone unit having a transducer-speaker disposed in a sealed housing and an elongated acoustical pick-up tube and an ear funnel communicating with opposite sides of the speaker and projecting from the housing. A radio transceiver is disposed in a second separate housing. The transceiver's signal converting section is electrically linked to the speaker-microphone unit through an elongated cable. Anchoring means attached to the exterior of the first housing adjacent the ear funnel cooperate therewith for releasably securing that housing in place adjacent the ear and mouth of the user on a helmet or headpiece. Pivoting or other movement of the first housing relative to the support device is prevented by the projecting ear funnel which engages an opening on the headwear.

11 Claims, 4 Drawing Figures

PORTABLE AUDIO COMMUNICATION TRANSCEIVER DEVICE

BACKGROUND OF THE INVENTION

1. Field of the Invention

The present invention generally relates to communication devices and more particularly to an improved portable voice communication device.

2. Description of the Prior Art

Portable battery-powered microphone receivers of the radio transceiver type, usually referred to as walkie-talkie devices, are commonly employed as close range, inexpensive communicators for a variety of purposes. Such devices have a disadvantage in that they usually must be hand-held for proper operation and thus are not useful in situations where both hands of the user must be kept free, as in the steering of a motorbike, motorcycle or the like or in the performance of other complicated manual tasks. This is particularly the case where the environmental noise level is high enough to interfere with sound reception and transmission if the transceiver is not placed very close to the user's mouth and ear.

Various other types of communicators have been used for close-range, high-noise-level situations, but most such devices feature electrical connections via cords and the like between the communicating users. Those devices obviously are of little or no use to motorcyclists and other users who require freedom of movement relative to one another but who still desire some easy and efficient means of sound communication. Accordingly, there is a need for an improved voice communication means which is inexpensive, portable, efficient, durable and safe, representing no hazard in use and which can be operated without use of the hands and can be effective in high-noise-level situations. Moreover, such means should be sufficiently compact and convenient so as to assure its general acceptance and use.

SUMMARY OF THE INVENTION

The foregoing needs have been satisfied by the improved portable voice communication device of the present invention. The device is substantially as described in the Abstract above. In this regard, the device comprises two separate units electrically interconnected by a flexible cable or the like. One unit is small and light in weight and comprises a housing which contains a transducer-speaker communicating with an elongated acoustical pick-up tube and with an ear funnel. Such unit through conventional anchoring means such as a snap button can be releasably attached to a helmet, headset, hat band or the like to properly position the funnel and acoustic pick-up tube relative to the ear and mouth of the user. Moreover, the ear funnel projects outwardly to engage a mating opening in the headwear to prevent pivoting of the unit from the proper operating position during use while at the same time improving the transmission of sound from the speaker-transducer to the user's ear.

The other unit of the device comprises a battery powered radio transceiver with its signal converting portion electrically connected by the cable to the transducer-speaker. The transceiver can be disposed, for example, on a belt, or in a garment pocket or the like of the user or can be otherwise attached in a convenient place near to or on the user.

The improved device of the invention permits the user to have complete freedom of both hands while still being in full voice communication with another user of the same type of equipment. Moreover, the device is light in overall weight, highly portable, compact, inexpensive, durable, functional, simple in construction and easy to use and repair. Various other features of the invention are set forth in the following detailed description and accompanying drawings.

DESCRIPTION OF THE PREFERRED EMBODIMENT

Figure 1:
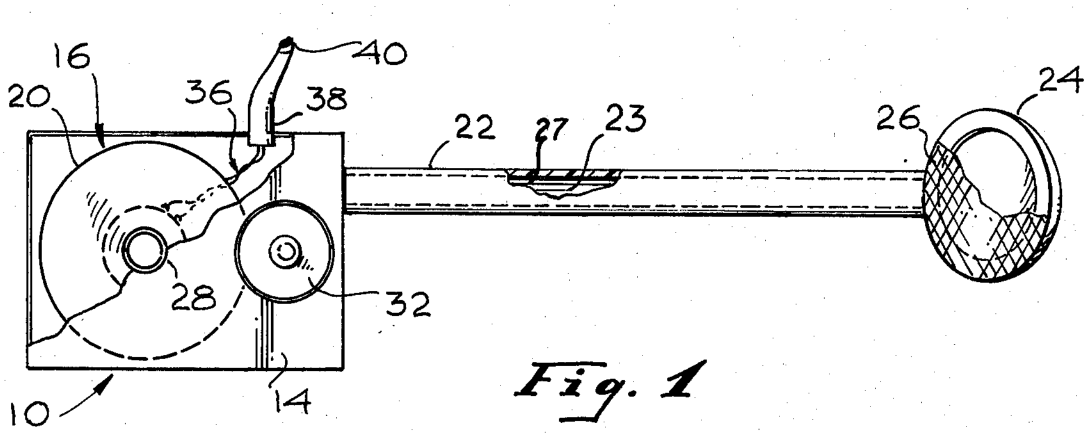
FIG. 1 schematically depicts in side elevation a preferred embodiment of the speaker-microphone unit of the device of the present invention, portions being broken away and other portions being shown in dotted outline to illustrate certain internal features thereof.
Figures 2, 3, 4:
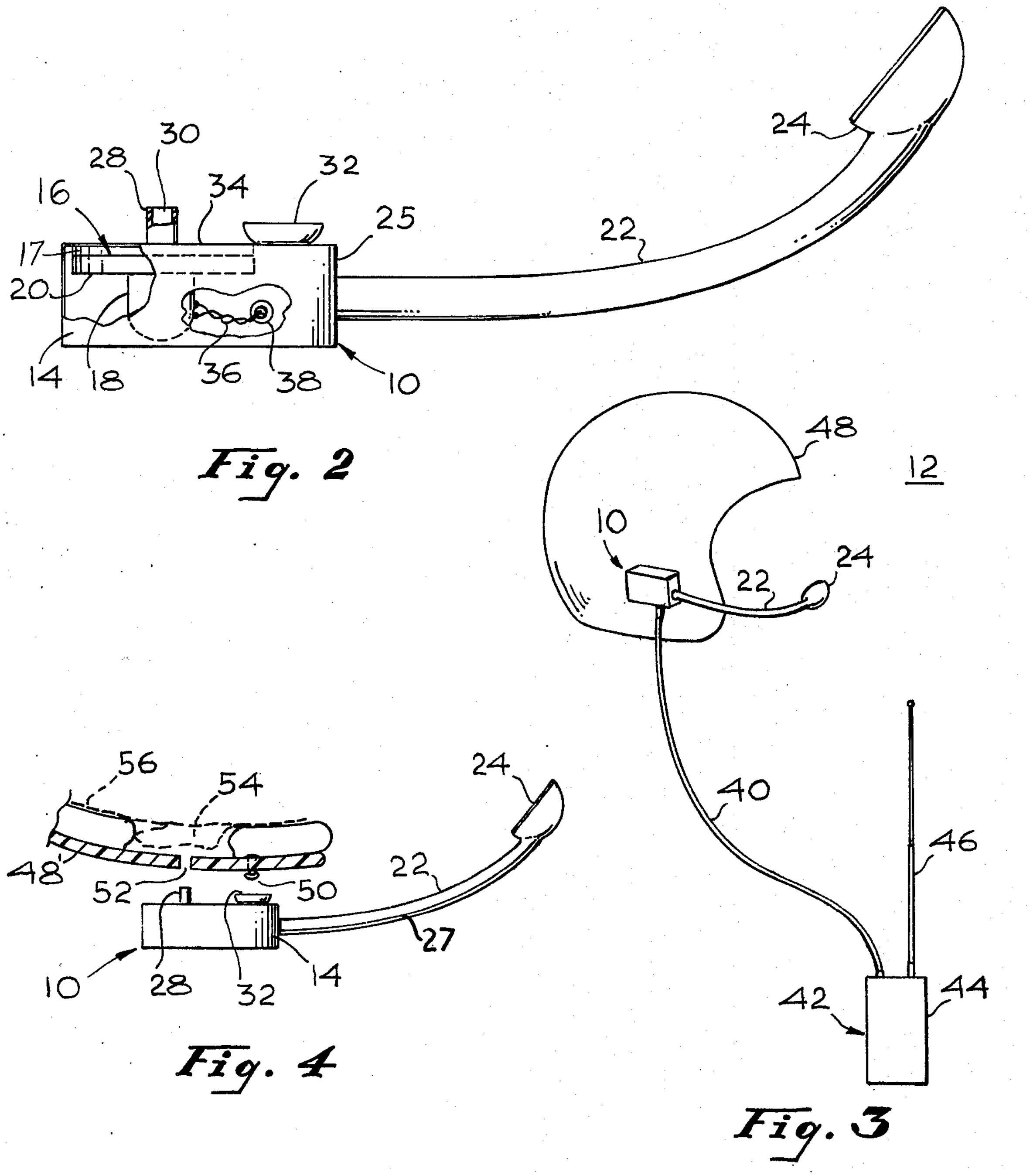
FIG. 2 schematically depicts in top plan view the unit of FIG. 1, portions being broken away and other portions being shown in dotted outline to illustrate certain internal features.
FIG. 3 schematically depicts in side elevation one preferred embodiment of the device of the invention, employing the unit of FIG. 1 mounted on a helmet and electrically linked to a radio transceiver unit of the present device.
FIG. 4 schematically depicts in fragmentary section a portion of the device of FIG. 3, including anchoring means thereof.

Now referring more particularly to FIGS. 1 and 2 of the accompanying drawings, the speaker-microphone unit 10 of one embodiment of the present device 12 (shown generally in FIG. 3) is schematically depicted in side elevation (FIG. 1) and in top plan view (FIG. 2). As shown in FIGS. 1 and 2, unit 10 includes a housing 14 within which is disposed a transducer-speaker 16 mounted on a hollow spacer 17 and comprising a transducer portion 18, which may include an inexpensive permanent magnet or the like (not shown) and a speaker 20. The transducer-speaker 16 is well-known in the communications art and can be fabricated in a suitable way, and be of any conventional design.

Unit 10 also includes an elongated hollow acoustical pickup tube 22 having a central passageway 23 extending therethrough and communicating with one side of speaker 20 in housing 14. Tube 22 is connected to and extends outwardly from the front end 25 of housing 14, as shown in FIGS. 1 and 2, and terminates in a speech-receiving outer end 24 which may be, for example, generally hemispherical in shape and include a protective grill 26 (as shown in FIG. 1) or can be open, if desired. Tube 22 preferably is curved (see FIG. 2) so that end 24 is reflected back towards housing 14, thus facilitating its positioning adjacent the mouth of the user for efficient passage of sounds through grill 26 into passageway 23. A support member 27 in the form of a thin wire or rod is provided within the tube 22 to maintain the curve thereof and the desired positioning of the end 24 adjacent the user's mouth. This wire 27, visible in FIG. 4 through a tube 22 which is shown as transparent, is stiff enough to maintain the selected curve of the tube 24 under forces normally encountered in use but is sufficiently pliant that the curve can be adjusted manually by the user so as to place the pickup at the outer end 24 of the tube 22 adjacent the user's mouth. The support member 27 is affixed to the housing 14 at the juncture of the member 27 and tube 22 with the housing 14.

Unit 10 further includes a short hollow tube or ear funnel 28 containing a central passageway 30 in communication with the side of speaker 20 opposite that which is in communication with tube 22. Funnel 28 is connected to and extends outwardly from housing 14, as shown in FIG. 2, and is coaxial with speaker 28. Tube 22 and its components, housing 14 and funnel 28 can be fabricated of any suitable conventional materials such as plastic, metal or the like.

Unit 10 bears on the exterior of housing 14 mounting means in the form of a snap button 32 or the like for releasably engaging housing 14 to headwear or the like, as hereinafter more particularly described for the purpose of supporting the unit 10 in proper position. Button 32 is positioned on the side 34 of housing 14 adjacent funnel 28 which cooperates therewith to prevent pivoting of housing 14 about the mountings means when so engaged with headwear or the like, again as more particularly described hereinafter.

A pair of electrical leads 36 are connected to transducer 18 and pass through an insulated connector 38 in housing 14 and into a flexible cable 40 or the like. As shown schematically in FIG. 3 of the drawings, cable 40 runs to a radio transceiver unit 42 which can be of any conventional design, for example, a walkie-talkie or the like powered by a battery or the like (not shown). Unit 42 includes a housing 44 from which extends antenna 46. The transceiver includes means for converting radio signals to audio signals and vice versa. It is this signal conversion portion (not shown) to which cable 40 is directly or indirectly connected. Accordingly, sound waves received by speaker 20 from tubes 22 are converted by transducer 18 to audio signals which are transmitted via cable 40 to the input side of the previously described signal conversion portion of unit 42. Therein the signals are converted to radio waves which are then broadcast and picked up by the transceiver of a like device 12 disposed a distance away. In the second transceiver the radio signals are reconverted to audio signals which are then transferred to the transducer 18 of that second device 12 and converted thereby to sound waves. The sound waves are emitted by the speaker 20 thereof through ear funnel 28 directly to the ear of the user of that second device 12 for full communication between the users of the devices 12.

It will be noted that radio transceiver unit 42 need not contain a speaker. If a conventional walkie-talkie transceiver is used as unit 42, the speaker circuit therein can be by-passed by cable 40 in its connection to the signal converting portion of unit 42.

As shown in FIG. 3, the anchoring means in accordance with the invention may include a helmet 48 to which unit 10 can be releasably attached. Details of the anchoring means are shown in FIG. 4. It will be understood that the headwear 48' of FIG. 4 can be a head set, ear loop, helmet or head band or other means of releasably attaching device 12 close to the user's head. In releasably connecting unit 10 to headwear snap 48', button 32 is engaged with a mating protrusion 50 on the side of headwear 48', while ear funnel 28 is releasably received within an aperture 52 extending through headwear 48'. It will be noted that aperture 52 is in direct line with the ear 54 of the user when his head 56 is normally disposed with respect to headwear 48' so that sounds issuing from speaker 20 are transmitted directly to the user's ear. When in place, unit 10 is securely but releasably held, lies flat against headwear 48' and is prevented from pivoting because of the cooperative action of funnel 28, aperture 52, snap button 32 and protrusion 50. Moreover, when unit 10 is in place, acoustical pick-up tube 22, which curves forward from housing 14 and toward the mouth of the user, is positioned so that end 24 (with grill 26) is directly in front of the user's mouth so as to facilitate sound transmission to tube 22, even in high-noise-level environments. It will be understood that device 10 can be rapidly attached to and detached from any suitable headwear bearing appropriate anchoring means, as described above.

Accordingly, a novel, convenient, portable, inexpensive and compact voice communication device is provided which is particularly suitable for use in high environmental noise level situations such as in voice transmission between motorcyclists and in other situations where the user must have both hands free, as in the steering of racing vehicles and the like and the repair of complicated equipment.

Various modifications, changes, alterations and additions can be made in the device of the present invention and its components and in their manner of cooperation and use. All such modification, changes, alterations and additions as are within the scope of the appended claims form part of the present invention.

What is claimed is:

1. An improved portable voice communication device comprising in combination:

A. a speaker-microphone unit comprising
   1. a transducer;
   2. an elongated hollow acoustical pick-up tube, in communication with said transducer;
   3. a first hollow housing enclosing said transducer, from which housing said pick-up tube extends;
   4. a hollow ear funnel extending from said housing and in communication with said transducer; and
   5. anchoring means attached to the exterior of said housing adjacent said ear funnel for releasably securing said unit adjacent the ear of the user;

B. a radio transceiver disposed within a second separate housing; and

C. an elongated cable means electrically linking said transducer and the signal converting portion of said radio transceiver, said anchoring means including headwear defining an aperture releasably receiving said funnel and also including snap means releasably cooperatively engaged on the exterior of said headwear and said first housing, to prevent pivoting of said first housing relative to said headwear.

2. The improved device of claim 1 wherein said acoustical pick-up tube is in communication with one side of said transducer and said ear funnel is in communication with the opposite side of said transducer.

3. The improved device of claim 1 wherein said acoustical pick-up tube includes a speech-receiving end and wherein said tube is curved and of sufficient length to position said speech-receiving end adjacent the mouth of a user when said funnel is adjacent the ear of said user.

4. The improved device of claim 1 wherein said headwear comprises a helmet.

5. The improved device of claim 1 wherein said headwear comprises a band releasably engaging at least a portion of the head of the user.

6. The improved device of claim 1 wherein said headwear comprises a head set.

7. The improved device of claim 2 wherein said transceiver comprises a walkie-talkie unit and wherein said funnel is coaxial with said transducer.

8. The improved device of claim 7 wherein said cable electrically by-passes the portion of said walkie-talkie unit.

9. A portable voice communication device comprising:

a unitary transducer mounted in a sealed housing so as to establish two separate chambers on opposite sides of the transducer;

a hollow ear funnel extending through the housing wall from one said chamber at a point next to the transducer;

an elongated hollow tube extending through the housing wall from the other chamber and coupled to an acoustical pick-up, said tube being supported by the housing and in turn supporting the pick-up in position adjacent a user's mouth when the ear funnel is in line with and adjacent a user's ear;

means electrically coupling the transducer with the input and output of an associated ratio transceiver; and anchoring means attached to the exterior of said housing adjacent said ear funnel, said anchoring means including headwear defining an aperture releasably receiving said funnel and also including snap means releasably cooperatively engaged on the exterior of said headwear and said housing to prevent pivoting of said housing relative to said headwear.

10. The device of claim 9 further including adjustable support means extending along at least a portion of said hollow tube and adapted to maintain the shape of said tube as adjusted by the user in order to support the pick-up in a selected position adjacent the user's mouth.

11. The device of claim 10 wherein the support means comprises a relatively rigid wire extending within the tube and affixed at one end to the housing, said wire being sufficiently pliant to be manually adjustable as to the shape thereof along its length.

* * * * *